United States Patent
Czaja et al.

(10) Patent No.: US 9,469,303 B2
(45) Date of Patent: Oct. 18, 2016

(54) METHOD FOR DETERMINING THE AXLE LOAD OF A VEHICLE

(71) Applicant: WABCO GmbH, Hannover (DE)

(72) Inventors: Daniel Czaja, Hannover (DE); Axel Stender, Hameln (DE); Thomas Treichel, Hannover (DE); Markus Wolf, Hildesheim (DE)

(73) Assignee: WABCO GmbH, Hannover (DE)

( * ) Notice: Subject to any disclaimer, the term of this patent is extended or adjusted under 35 U.S.C. 154(b) by 70 days.

(21) Appl. No.: 14/445,351

(22) Filed: Jul. 29, 2014

(65) Prior Publication Data

US 2015/0039216 A1 Feb. 5, 2015

(30) Foreign Application Priority Data

Aug. 2, 2013 (DE) .................. 10 2013 012 993

(51) Int. Cl.
*B60W 40/13* (2012.01)
*B60T 8/1755* (2006.01)
*B60W 30/18* (2012.01)
*B60W 50/00* (2006.01)

(52) U.S. Cl.
CPC .......... *B60W 40/13* (2013.01); *B60T 8/17551* (2013.01); *B60W 30/18145* (2013.01); *B60W 2040/1307* (2013.01); *B60W 2050/0088* (2013.01); *B60W 2520/28* (2013.01)

(58) Field of Classification Search
None
See application file for complete search history.

(56) References Cited

U.S. PATENT DOCUMENTS

| 5,458,405 | A  | * | 10/1995 | Watanabe | B60T 8/1755 303/113.1 |
|---|---|---|---|---|---|
| 6,053,583 | A  | * | 4/2000 | Izumi | B60T 8/17552 701/91 |
| 6,360,150 | B1 | * | 3/2002 | Fukushima | B60T 8/17552 701/41 |
| 6,494,281 | B1 | * | 12/2002 | Faye | B60T 8/17554 701/1 |
| 7,013,721 | B2 | * | 3/2006 | Keller | B60T 8/1725 73/146 |
| 9,061,562 | B2 | * | 6/2015 | Hayakawa | B60G 17/01933 |
| 2002/0038193 | A1 | * | 3/2002 | Grunberg | B60G 11/27 701/37 |
| 2004/0002795 | A1 | * | 1/2004 | Tanimoto | B60T 8/17551 701/72 |

(Continued)

FOREIGN PATENT DOCUMENTS

| DE | 100 14 220 A1 | 9/2001 |
|---|---|---|
| DE | 10 2004 035 579 A1 | 2/2006 |
| DE | 10 2004 060 809 A1 | 6/2006 |

(Continued)

*Primary Examiner* — Rami Khatib
*Assistant Examiner* — David Merlino
(74) *Attorney, Agent, or Firm* — Brinks Gilson & Lione

(57) ABSTRACT

Disclosed is a method for determining the axle load of a vehicle (10) having at least two tires on an axle. During cornering, the axle load is determined from a difference between wheel speeds at a wheel on the inside of the bend and wheel speeds at a wheel on the outside of the bend and by taking into account the lateral acceleration and track width.

5 Claims, 1 Drawing Sheet

(56) References Cited

U.S. PATENT DOCUMENTS

| | | | | |
|---|---|---|---|---|
| 2004/0193352 | A1* | 9/2004 | Ito | B60T 8/1837 701/70 |
| 2006/0064238 | A1* | 3/2006 | Kitano | B60C 23/061 701/124 |
| 2007/0204685 | A1* | 9/2007 | Corniot | B60C 23/061 73/146.2 |
| 2008/0272899 | A1* | 11/2008 | Penzotti | B60T 8/17554 701/1 |
| 2008/0319626 | A1* | 12/2008 | Ogawa | B60T 8/172 701/80 |
| 2009/0177346 | A1* | 7/2009 | Hac | B60W 40/13 701/31.4 |
| 2010/0049415 | A1* | 2/2010 | Bauerle | B60T 8/1837 701/78 |
| 2010/0211261 | A1* | 8/2010 | Sasaki | B60W 40/11 701/37 |
| 2010/0332098 | A1* | 12/2010 | Kato | B60T 8/17554 701/72 |
| 2011/0218764 | A1* | 9/2011 | Fujita | G01G 19/086 702/175 |
| 2013/0144500 | A1* | 6/2013 | Watanabe | B60T 8/1766 701/73 |
| 2013/0204503 | A1* | 8/2013 | Watanabe | B60T 8/1755 701/78 |
| 2015/0006034 | A1* | 1/2015 | Kozuka | B60T 8/17551 701/41 |
| 2015/0290995 | A1* | 10/2015 | Kanda | B60G 17/0161 701/37 |

FOREIGN PATENT DOCUMENTS

| | | |
|---|---|---|
| DE | 10 2006 050 875 A1 | 5/2007 |
| DE | 10 2011 002 957 A1 | 7/2012 |

* cited by examiner

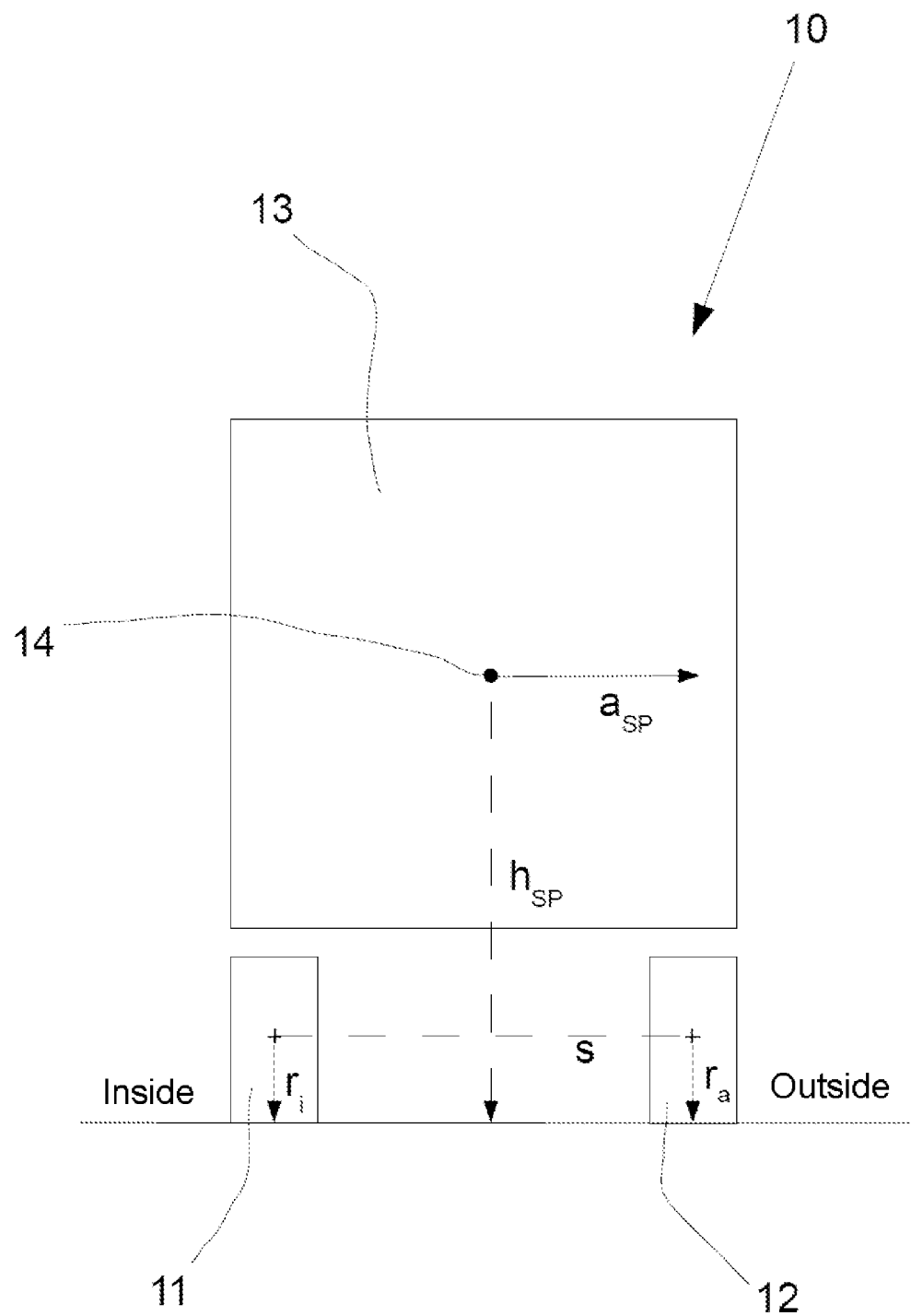

METHOD FOR DETERMINING THE AXLE LOAD OF A VEHICLE

TECHNICAL FIELD OF THE INVENTION

The present application relates to a method for determining the axle load of a vehicle having at least two tires on an axle. Furthermore, the invention relates to an electronic brake system and to an electronic control device for carrying out the method, and to a vehicle having an electronic brake system.

BACKGROUND OF THE INVENTION

Utility vehicles are typically equipped with pneumatically activated brakes. Actuation is carried out via a combination of two systems, which operate primarily electronically and secondly pneumatically. Owing to the electronic actuation, the vehicle brake system is also referred to as an electronic brake system EBS.

The electronic actuation permits significantly faster response by the brakes than in the case of pure pneumatic actuation. This permits, in combination with wheel rotary speed sensors and, if appropriate, a lateral acceleration sensor, various safety functions such as an anti-lock brake function and traction control. Stability control is also possible. As a result of the cargo, utility vehicles can have such a high center of gravity that they can tip over when cornering through a bend in the roadroadway. This applies to trailer vehicles in particular. The respective axle load, inter alia, is significant for stability control. The axle load is determined using a height travel sensor in the case of mechanically sprung vehicles and using a bellows pressure sensor in the case of air-sprung vehicles. Said sensors constitute additional expenditure.

SUMMARY OF THE INVENTION

The object of the present invention is to provide a method for determining the axle of a vehicle without using the specified sensors. In particular when the axle load is to be determined using the signals of sensors which are present in any case. For the stability function an approximate estimation of the cargo of the vehicle is sufficient here.

In order to achieve the object, the method according to the invention includes that axle load is determined during cornering of the vehicle through a bend in the roadroadway from a difference between wheel rotational speeds at a wheel inside of the bend and wheel rotational speeds at a wheel outside of the bend, by taking into account the lateral acceleration and track width. The wheel inside of the bend is the wheel moving along a smaller curve radius than the opposite wheel, i.e. whe wheel outside of the bend.

In the case of cornering of a two-track vehicle the outside wheel travels a greater distance than the wheel on the inside of the bend. Correspondingly, the wheel rotational speed of the wheel on the outside of the bend is higher during cornering. The difference between the wheel rotational speeds resulting from the two-track character of the vehicle is referred to as the wheel differential speed $\Delta V_A$.

As a result of the lateral acceleration which becomes effective at the center of gravity of the vehicle during cornering, an increased load is produced at the wheel on the outside of the bend and corresponding relieving of load occurs at the wheel on the inside of the bend. The wheels are embodied as car tires which are filled with air. In the case of relatively high load, the effective tire radius is reduced. As a result, a further increase in the wheel rotational speed, referred to here as difference $\Delta V_R$, occurs for the wheel on the outside of the bend. The current axle load can be estimated from this further increase in the wheel rotational speed, specifically from the difference $\Delta V_R$.

A wheel differential speed $\Delta V_M$ which is measured by means of the wheel rotary speed sensors is at the same time the sum of the difference $\Delta V_R$ and the wheel differential speed $\Delta V_A$. In order to determine the difference $\Delta V_R$, the wheel differential speed $\Delta V_A$ is calculated from the measured wheel differential speed $\Delta V_M$. The bend radius is required to determine the wheel differential speed $\Delta V_A$. Said bend radius can be determined from the lateral acceleration and speed of the vehicle. The lateral acceleration is obtained directly from the signals of a lateral acceleration sensor which is present. The speed of the vehicle is obtained as a mean value from signals of the wheel rotary speed sensors.

According to a further concept of the invention, the calculation of the axle load occurs only during cornering above a threshold value of the lateral acceleration. Furthermore, in particular when starting the vehicle, for safety reasons the axle load of a fully laden vehicle is assumed. The subsequent calculation permits the axle load which is used as the basis for subsequent calculations to be reduced.

The threshold value is advantageously larger than or equal to 1 m/s². As a further secondary condition it is possible to provide that the lateral acceleration has to be below a triggering threshold of the stability function. That is to say the axle load is determined only if the stability function is not active.

According to another aspect of the invention in the case of renewed cornering, the axle load can be determined again. In particular, mean values can be formed with the previously applicable axle load. Weighted formation of mean values can also be provided, for example in such a way that the value determined last is given a higher weighting than the previously determined value.

According to a further feature of the invention, after a stationary state of the vehicle within a period or after travel at low speeds below a threshold value, in the case of renewed cornering the axle load can be determined again. Under the aforesaid conditions, it has been found empirically that changes take place in the cargo. Preferably, weighted linking of the newly determined axle load with the previously applicable axle load is carried out. The result is a computational axle load according to a weighted mean value, with greater weighting of the newly determined axle load compared to the previously applicable axle load.

The method according to the invention can advantageously be used for all two-track vehicles with tires, wheel rotary speed sensors and lateral acceleration sensors, in particular utility vehicles or trailer vehicles with an electronic brake system. However, the method can also be used for passenger cars or other vehicles with hydraulic brakes if it is necessary to estimate the axle load for any desired purposes.

The object of the invention is also an electronic brake system for a vehicle, in particular for a trailer vehicle. The electronic brake system determines the axle load of the vehicle according to the method described above. In this context, the brake system preferably checks whether a critical driving state is present by taking into account the axle load.

An electronic control device for carrying out the method described above, in particular a brake control device, is also a subject matter of the invention. The method and the parameters necessary for it can be component of the software of the control device. With the brake control device, for example the electro-magnetic control valves of compressed air brakes are actuated within the scope of an electronic brake system.

Finally, the subject matter of the invention is also a vehicle having an electronic control device or having an electronic brake system, in each case as explained above. The vehicle is preferably a trailer vehicle, in particular with compressed air brakes, wheel rotary speed sensors and lateral acceleration sensors.

Further features of the invention can also be found in the description of the appended drawing. Advantageous exemplary embodiments of the invention are explained below with reference to the single drawing.

BRIEF DESCRIPTION OF THE DRAWING

In the drawings, FIG. 1 shows a simplified rear view of a trailer vehicle with two rear wheels and a box-shaped body.

DETAILED DESCRIPTION OF THE DRAWING

FIG. 1 shows a simplified rear view of a trailer vehicle 10 with two rear wheels 11, 12 and a box-shaped body 13. The trailer vehicle 10 is equipped in a manner known per se with compressed air brakes, an electronic brake system, a brake control device with a lateral acceleration sensor and with wheel rotary speed sensors.

Cornering with the wheel 11 as the wheel on the inside of the bend and the wheel 12 as the wheel on the outside of the bend is assumed. In this context, a lateral acceleration $a_{SP}$ acts on a center of gravity 14. The center of gravity 14 is as a height $h_{SP}$.

The center of gravity 14 is assumed here to be a location of an axle load which is effective on the wheels 11, 12. As a result of the axle load, the tires on the wheels 11, 12 are deformed. The deformation of the tires occurs in accordance with the lateral acceleration which occurs. The effective tire radius $r_a$ of the wheel 12 on the outside of the bend is reduced, while the effective tire radius $r_i$ of the wheel 11 inside of the bend increases somewhat. This effect is used for the calculation of the axle load.

A non-limiting calculation example for the determination of the axle load from the deformation of the tires during cornering is given below:

Speed of the vehicle 10 at the center of gravity $$v_{SP} = 11 \frac{m}{s}$$

(can be determined from a mean value of the wheel rotational speeds, derived from the values of wheel rotary speed sensors)

Lateral acceleration during cornering constant $a_{SP}$=0.15 g=1.47 m/s² (from the signals on an acceleration sensor)

Height of the center of gravity $h_{SP}$=2.3 m (assumed in a generalized fashion for the type of vehicle or calculated or estimated in some other way)

Track width s=2.0 m (vehicle constant)

Tire radius $r_0$=0.517 m (measurement in a stationary state or constant depends on the type of tire)

Tire rigidity $$C_R = 1/(2.1 \times 10^6) \frac{m}{N}$$

(constant depending on the type of tire)

Measured wheel differential speed $\Delta V_M$ (outside/inside) 0.37 m/s, and

Exemplary calculation for 1 axle

A theoretical wheel differential speed $\Delta V_A$ during cornering in the two-track model, specifically wheel speed on the outside $v_a$, minus wheel speed on the inside $v_i$, is determined from the lateral acceleration, the speed at the center of gravity and the track width:

$$\Delta V_A = v_a - v_i = \frac{a_{SP}}{v_{SP}} \times s = 0.26 \text{ m/s} \qquad \text{(equation 1)}$$

From the values of the wheel rotary speed sensors a measured wheel differential speed $\Delta V_M$ is obtained. $\Delta V_A$ and $\Delta V_M$ differ from one another somewhat. The difference $\Delta V_R$ is here:

$$\Delta V_R = \Delta V_M - \Delta V_A = 0.37 \text{ m/s} - 0.26 \text{ m/s} = 0.11 \text{ m/s} \qquad \text{(equation 2)}$$

The difference $\Delta V_R$ (of the wheel differential speeds) is obtained here solely from a deformation of the tires during cornering, which gives rise to a change in the tire radii and the wheel rotary speeds. $\Delta V_R$ is calculated from the angular speed $\omega$ of a wheel, multiplied by the change in the radius $\Delta r$:

$$\Delta V_R = \omega \times \Delta r \qquad \text{(equation 3)}$$

The angular speed $\omega$ of a wheel is obtained from the translatory wheel speed and tire radius:

$$\omega = \frac{v}{r} \qquad \text{(equation 4)}$$

The speed $v_{SP}$ at the center of gravity corresponds to the translatory wheel speed; the tire radius $r_0$ can be measured in the stationary state:

$$\omega = \frac{v_{SP}}{r_0} \qquad \text{(equation 5)}$$

Equation 3 with equation 5 yields:

$$\Delta V_R = \frac{v_{SP}}{r_0} \times \Delta r \qquad \text{(equation 6)}$$

after conversion the change in the radius $\Delta r$ is obtained:

$$\Delta r = \Delta V_R \times \frac{r_0}{v_{SP}} = 0.11 \frac{m}{s} \times \frac{0.517 \text{ m}}{11 \frac{m}{s}} \approx 0.005 \text{ m} \qquad \text{(equation 7)}$$

The calculated deformation of the tire (change in radius) relates to both tires, i.e. 0.0025 m per wheel. The change in radius $\Delta r$ is also obtained from the change $\Delta F$ in the wheel load and the rigidity $C_R$ of the tire:

$$\Delta r = \frac{\Delta F}{C_R} \quad \text{(equation 8)}$$

where $C_R = 1/(2.1 \times 10^6) \frac{m}{N}$ after deformation the change in the wheel load is obtained:

$$\Delta F = \frac{\Delta r}{C_R} = 0.005 \text{ m} \times 2.1 \times 10^6 \frac{N}{m} = 10\,500 \text{ N} \quad \text{(equation 9)}$$

The change ±ΔF in wheel load per wheel at one axis is obtained from:

$$\Delta F = \frac{2 \times a_{SP} \times m \times h_{SP}}{s} \quad \text{(equation 10)}$$

after conversion an axle load m of:

$$\begin{aligned} m &= \frac{\Delta F \times s}{2 \times a_{SP} \times h_{SP}} \quad \text{(equation 11)} \\ &= \frac{10\,500 \text{ N} \times 2.0 \text{ m}}{1.47 \frac{m}{s^2} \times 2.3 \text{ m}} \\ &= 3105 \text{ kg} \end{aligned}$$

$$\begin{aligned} m &= \frac{\Delta F \times s}{2 \times a_{SP} \times h_{SP}} \\ &= \frac{10\,500 \text{ N} \times 2.0 \text{ m}}{2 \times 1.47 \frac{m}{s^2} \times 2.3 \text{ m}} \\ &= 3105 \text{ kg} \end{aligned}$$

is obtained.

In the present case, for example, an axle load of the vehicle of 3105 kg is assumed in the given example. Since only a rough estimate is aimed at, the following classification, for example, is sufficient:

Less than 2001 kg=unladen vehicle
2001 kg-5000 kg=partially laden vehicle
5001 kg or more=fully laden vehicle.

3105 kg axle load then means a partially laden vehicle. For the further calculations within the scope of a stability system or for other tasks of an electronic brake system a partial cargo of the vehicle is assumed. The assumed ranges of an unladen, partially laden, and fully laden state are specific to a given vehicle and may be stored in the electronic control system.

A person skilled in the art will recognize from the previous description that modifications and changes can be made to the present disclosure without departing from the scope of the invention as defined in the following claims.

What is claimed is:

1. A method of controlling a vehicle (10) having at least two wheels on one axle, the at least two wheels defining a track width, the method comprising the following steps:
    determining, during cornering through a bend, a difference between wheel speeds at a bend-inner wheel and at a bend-outer wheel on the one axle;
    measuring a lateral vehicle acceleration;
    determining an axle load by taking into account the lateral acceleration, the difference between the wheel speeds, and the track width, wherein the-axle load is a sum of loads acting on the at least two wheels of the one axle,
    outputting information representative of the axle load to a vehicle brake system, and
    operating the vehicle brake system by taking into account the axle load.

2. The method as claimed in claim 1, wherein the axle load is determined only during cornering when the lateral acceleration exceeds a threshold value for the lateral acceleration, further comprising the step of
    assuming, at least when starting the vehicle (10), an assumed axle load of a fully laden vehicle, wherein the assumed axle load of the fully laden vehicle is higher than a partially-laden-vehicle axle load and than an empty-vehicle axle load, the assumed axle load of the fully laden vehicle being specific to the vehicle and stored in an electronic control system.

3. The method as claimed in claim 2, wherein the threshold value is larger than or equal to 1 m/s².

4. The method as claimed in claim 1, wherein the step of determining the axle load comprises the steps of
    determining a first axle load value during cornering;
    determining a second axle load during a subsequent cornering, and
    generating a mean value representing the axle load from at least the first axle load value and the second axle load value.

5. The method as claimed in claim 1, wherein the step of determining the axle load comprises the steps of
    determining a first axle load value during cornering;
    determining a second axle load during a subsequent cornering within a period of time after at least a stationary state of the vehicle or after travel at low speeds below a threshold value, and
    generating a weighted mean value representing the axle load from at least the first axle load value and the second axle load value.

* * * * *